United States Patent
Hoffjann et al.

(10) Patent No.: US 7,954,753 B2
(45) Date of Patent: Jun. 7, 2011

(54) SUPPLY SYSTEM FOR THE ENERGY SUPPLY IN AN AIRCRAFT, AIRCRAFT AND METHOD FOR SUPPLYING AN AIRCRAFT WITH ENERGY

(75) Inventors: Claus Hoffjann, Hamburg (DE); Hansgeorg Schuldzig, Jork (DE); Torge Pfafferott, Hamburg (DE); Lars Frahm, Hamburg (DE); Lars Nickel, Süderbrarup (DE)

(73) Assignee: Airbus Deutschland GmbH (DE)

( * ) Notice: Subject to any disclaimer, the term of this patent is extended or adjusted under 35 U.S.C. 154(b) by 768 days.

(21) Appl. No.: 11/792,283

(22) PCT Filed: Dec. 2, 2005

(86) PCT No.: PCT/EP2005/012912
§ 371 (c)(1),
(2), (4) Date: May 31, 2007

(87) PCT Pub. No.: WO2006/058774
PCT Pub. Date: Jun. 8, 2006

(65) Prior Publication Data
US 2008/0001026 A1 Jan. 3, 2008

Related U.S. Application Data

(60) Provisional application No. 60/633,016, filed on Dec. 3, 2004.

(30) Foreign Application Priority Data

Dec. 3, 2004 (DE) .......................... 10 2004 058 430

(51) Int. Cl.
*B64D 27/00* (2006.01)

(52) U.S. Cl. ...................................... 244/53 R; 244/58
(58) Field of Classification Search .............. 244/53 R, 244/58; 903/908
See application file for complete search history.

(56) References Cited

U.S. PATENT DOCUMENTS

| 4,505,445 | A | | 3/1985 | Allison | |
|---|---|---|---|---|---|
| 5,541,014 | A | * | 7/1996 | Micheli et al. | 429/19 |
| 6,296,957 | B1 | * | 10/2001 | Graage | 429/12 |
| 6,450,447 | B1 | * | 9/2002 | Konrad et al. | 244/53 R |

(Continued)

FOREIGN PATENT DOCUMENTS

DE 19911018 8/2000

(Continued)

OTHER PUBLICATIONS

Reynolds et al., "Onboard Inert Gas Generation System/Onboard Oxygen Gas Generation System (OBIGGS/OBOGS) Study Part II: Gas Separation Technology-State of the Art", NASA/CR-2001-210950, Aug. 2001.

(Continued)

*Primary Examiner* — Christopher P Ellis
(74) *Attorney, Agent, or Firm* — Lerner, David, Littenberg, Krumholz & Mentlik, LLP

(57) ABSTRACT

A supply system for the energy supply in an aircraft comprising an engine for propelling an aircraft, a fuel cell for supplying an aircraft with electric energy, a first fuel reservoir for supplying the engine with engine fuel and a second fuel reservoir for supplying the fuel cell with fuel cell fuel. The first fuel reservoir is arranged separately of the second fuel reservoir.

26 Claims, 2 Drawing Sheets

U.S. PATENT DOCUMENTS

Figure 1:
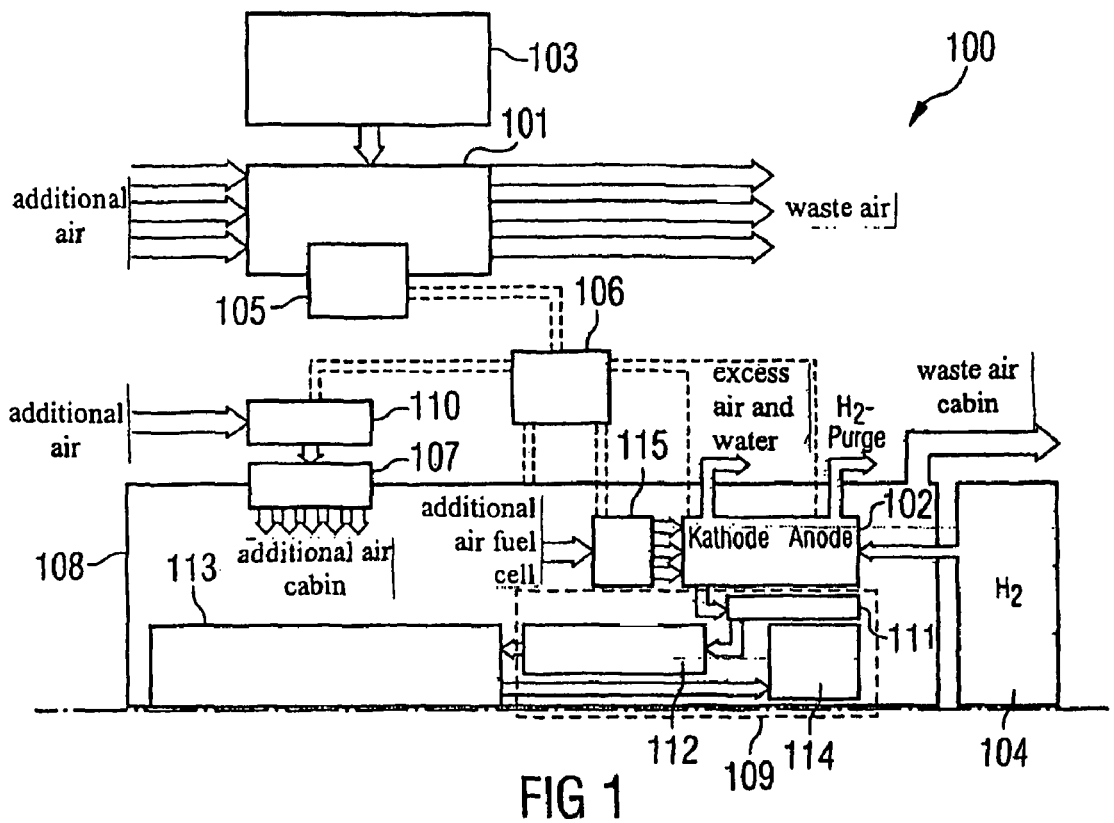

| | | | |
|---|---|---|---|
| 6,641,084 B1 * | 11/2003 | Huber et al. | 244/48 |
| 7,281,681 B2 * | 10/2007 | MacCready et al. | 244/59 |
| 7,431,238 B2 * | 10/2008 | Hoffjann et al. | 244/58 |
| 7,520,350 B2 * | 4/2009 | Hotto | 180/65.25 |
| 2003/0075643 A1 | 4/2003 | Dunn | |
| 2003/0134167 A1 | 7/2003 | Hirakata | |
| 2003/0162062 A1 * | 8/2003 | Hoenig et al. | 429/19 |
| 2004/0043276 A1 | 3/2004 | Hoffjann et al. | |
| 2004/0124308 A1 | 7/2004 | Daggett | |
| 2004/0245382 A1 * | 12/2004 | Nozaki | 244/53 R |
| 2006/0138278 A1 | 6/2006 | Gans | |

FOREIGN PATENT DOCUMENTS

| | | | |
|---|---|---|---|
| DE | 20205813 U1 * | 2/2003 | |
| DE | 10216709 A1 | 4/2003 | |
| DE | 10249588 A1 | 5/2004 | |
| DE | 10252292 A1 | 6/2004 | |
| DE | 102004044646 A1 | 3/2006 | |
| EP | 0 957 026 A2 | 11/1999 | |
| FR | 2848032 A1 | 6/2004 | |
| GB | 607374 A | 8/1948 | |
| GB | 2338750 A | 12/1999 | |
| JP | 2002-7580 A | 3/2002 | |
| JP | 2002-70580 A | 3/2002 | |
| RU | 2233511 C1 | 7/2004 | |
| WO | WO 0148367 A1 * | 7/2001 | |
| WO | WO-2004/037641 A2 | 5/2004 | |

OTHER PUBLICATIONS

Office Action from corresponding Russian Application No. 2007119942/11 dated May 4, 2010.

* cited by examiner

SUPPLY SYSTEM FOR THE ENERGY SUPPLY IN AN AIRCRAFT, AIRCRAFT AND METHOD FOR SUPPLYING AN AIRCRAFT WITH ENERGY

This application claims the benefit of the filing date of U.S. Provisional Patent Application No. 60/633,016 filed Dec. 3, 2004, and of German Patent Application No. 10 2004 058 430.3 filed Dec. 3, 2004, the disclosures of which are hereby incorporated herein by reference.

The invention relates to a supply system for the energy supply in an aircraft, an aircraft and a method for supplying an aircraft with energy.

In conventional aircraft used in civil aviation, systems for supplying the passengers or the crew are usually separated from one another.

The supply of breathing air and the pressurization of the cabin are realized with the aid of an air-conditioning system that comprises one or more air-conditioners. Such an air-conditioning system receives its compressed air supply in the form of so-called bleed air of the engines. Such bleed air is drawn off the main air flow of the engine behind a compressor stage thereof.

The emergency oxygen supply required in the event of a cabin depressurization is usually carried along in pressure tanks or produced by means of chemical methods. In both instances, the maximum supply time is limited and dependent on the filling contents of the pressure tanks or the burning time of chemical chlorate candles, respectively.

The on-board water supply is usually carried along in water tanks and distributed to water consumers such as galleys and toilets or lavatories, respectively. The quantity of water being carried along is dependent on the length of the flight and limited by the capacity of the water tanks and by the resulting weight.

EP 0,957,026 B1 discloses an aircraft with an energy supply unit, in which an engine and a fuel cell are supplied from a common hydrogen tank that serves as fuel reservoir.

There my be a need to provide a failsafe energy supply in an aircraft.

This need may be met with a supply system for the energy supply in an aircraft, with an aircraft and with a method for supplying an aircraft with energy that are respectively realized in accordance with the features disclosed in the independent claims.

According to an exemplary embodiment the energy supply in an aircraft comprises an engine for propelling the aircraft, a fuel cell for supplying an aircraft with electric energy, a first fuel reservoir for supplying the engine with engine fuel and a second fuel reservoir for supplying the fuel cell with fuel cell fuel. According to the invention, the first fuel reservoir is arranged separately of the second fuel reservoir.

In addition, the invention achieves an aircraft with a supply system for the energy supply in an aircraft with the above-described characteristics.

According to an exemplary embodiment a method for supplying an aircraft with energy is provided, in which the aircraft is propelled by an engine, the aircraft is supplied with electric energy by a fuel cell, the engine is supplied with engine fuel from a first fuel reservoir and the fuel cell is supplied with fuel cell fuel from a seconds fuel reservoir. The first fuel reservoir is arranged separately of the second fuel reservoir.

One idea of the invention can be seen in that the energy supply in an aircraft (for example, in an airplane or an airship) is realized with an engine for mechanically propelling the aircraft and with a fuel cell for supplying electric power consumers in the aircraft with electric energy (the engine may also generate electric energy). The respective fuel reservoirs provided for the engine and for the fuel cell are arranged separately of one another, i.e., they are functionally decoupled and physically separated, respectively, and it is therefore reliably prevented that a malfunction in one fuel reservoir or energy supply system negatively affects the other fuel reservoir or energy supply system. The continued supply of electric energy to components of the aircraft should also be ensured, in particular, in case of an emergency, in which, for example, an engine fails or at least sustains damage and vice versa. The two fuel reservoirs for respectively accommodating the fuel for supplying the engine and the fuel for supplying the fuel cell consequently are realized in the form of separately arranged components such that, if a fuel shortage occurs in one of the two fuel reservoirs, the other fuel reservoir is still available for at least partially maintaining important functions. The engine may also comprise a generator in the form of a starter generator that contributes to the energy supply of the aircraft.

Therefore, the invention may provide a sophisticated and interference proof supply system which is logistically good manageable and which reliably supplies mechanical and electrical energy consumer in the aircraft with energy. The integration of a fuel cell according to the present invention into an aircraft may make it possible to supply energy consumers by the concept of a fuel cell. The engine, according to the invention, may resign the use of bleed air in contradiction to common engines. This form of energy may be replaced by electrical energy.

The supply system preferably not only serves for the energy supply, but also for supplying the cabin and the aircraft in general.

The invention may achieve a highly integrated cabin system and an aircraft with a highly integrated cabin system, respectively. The invention provides an arrangement for an aircraft that serves for supplying the passengers and the crew with breathing air, emergency oxygen and water, wherein this is achieved simultaneously with an integrated fuel cell system.

The term fuel cell refers to an electrochemical cell that converts the reaction energy of a continuously supplied fuel (for example, hydrogen) and an oxidant (for example, oxygen) into electric energy that can be used for the energy supply of energy consumer components. In a hydrogen-oxygen fuel cell, the product water is obtained from the starting materials hydrogen and oxygen, and the energy released during the exothermal reaction can be used for the energy supply of energy consumer components.

The invention may achieve, in particular, an inventive combination of the components of an integrated cabin system that makes it possible to realize a fail-safe and reliable energy supply in the aircraft.

Such a supply system in an aircraft can be equipped with a pressure cabin, engines (that, according to the invention, do not necessarily have to deliver bleed air), a fuel cell system, an air-conditioning system and a water procurement, water conditioning and water distribution system in order to supply water for the passengers or the crew.

According to the invention, it may be possible to eliminate, in particular, an auxiliary power unit or APU for starting the engine, as well as separate compressed air and power supplies and at least part of the batteries.

According to the invention, engines may be equipped with starter generators, in particular, for starting the engines and for generating electric energy for electric power consumers in an aircraft.

An air-conditioning system can be supplied by separate compressors that are electrically operated. The required electric energy can be supplied by the starter generators or the fuel cell system.

The fuel cell system also may—in addition to electric energy—supply water for realizing the water supply in the aircraft. This water can be conditioned before it is delivered to consumers in the aircraft in the form of drinking water.

According to the invention, the oxygen to be supplied to the fuel cell system is obtained, for example, from the oxygen fraction of the cabin air by a separate ventilator or from the oxygen fraction of the outside air delivered to the air-conditioner via a direct connection with the air-conditioner. The oxygen supply of the fuel cell system can also be realized by (separately compressing) outside air obtained from the external surroundings of the aircraft.

In low-temperature fuel cells of the PEM type (Polymer Electrolyte [sic] fuel cells and related types), the fuel used by the fuel cell system preferably is hydrogen or the hydrogen fraction of a reformate gas and may be present in gaseous or liquid form. In DMFCs (Direct Methanol Fuel Cells), the fuel used by the fuel cell system is methanol.

The fuel for the engines may be a hydrocarbon (such as kerosene) or also of hydrogen. The fuel for the engines is accommodated in a different fuel reservoir than the fuel for supplying the fuel cell with fuel cell fuel.

According to the invention, an oxygen generator may be provided, for example, in addition to the above-described components. The oxygen generated by this oxygen generator can be obtained from the outside air by using a membrane separation method and used as an emergency supply in the event of a cabin depressurization.

The operation of such an oxygen generator requires (compressed) air that is usually obtained from the bleed air of the engines and, according to the invention, may also originate from electric compressors. These compressors may be the same compressors that supply the air-conditioning system when the supply system operates in the normal mode. In operating modes other than the emergency mode, the oxygen generated by the oxygen generator can be used for increasing the oxygen partial pressure on the cathode side of the fuel cell. It is also advantageous that the oxygen generator supplies the air-conditioning system with an increased oxygen partial pressure in the normal operating mode such that cabin pressure can be lowered. Consequently, the energy requirement, the space requirement and the weight may be reduced because smaller compressors can be utilized.

Oxygen-depleted air, the main constituent of which is nitrogen, is accumulated on the other side of the molecular sieve of an oxygen generator. This depleted air can be regarded as an inert gas mixture that, according to the invention, may be used for purging the enclosure of the fuel cell system in order to prevent the formation of explosive mixtures at this location.

This gas can also be utilized in fuel tanks that contain liquid hydrocarbons as energy carriers in order to displace the oxygen above the level of the liquid and thusly lower the concentration of explosive mixtures below the explosion limit.

The supply system according to the invention can be alternatively or additionally used for wing de-icing. The cathode waste air accumulating in the fuel cell system can be used for the procurement of water. Since this cathode waste air essentially has the operating temperature of the fuel cell, a condensation and therefore a temperature reduction, for example, by a heat exchanger and a steam trap, need to be realized for the procurement of water. In order to obtain as much condensate as possible, the cathode waste air should be lowered to a temperature level between 1° Celsius and 10° Celsius. The fuel cell stack should also be cooled because the fuel cell process takes place exothermally. The heat accumulating in the condenser and during the cooling of the fuel cell stack can be returned to the cathode waste air with the aid of a heat pump system. The thusly obtained hot air can be delivered to the wing edges via a pipeline system and used for wing de-icing. The above-described compressors also produce waste heat. This waste heat can be delivered to the cathode waste air as well by the heat pump system.

According to one aspect of the invention, a thusly created arrangement comprises an aircraft for transporting passengers and/or cargo and may be provided with at least one pressure cabin.

Such an aircraft may comprise at least one engine that preferably does not deliver bleed air, but rather is equipped with starter generators for starting the engine and for the power supply. In addition, at least one air-conditioning system with a separate compressor may be provided for supplying the pressure cabin with fresh air and for realizing the required ambient pressure for the passengers or the crew. The arrangement also comprises at least one modularly designed fuel cell system that can entirely or partially replace a conventional water tank installation. Such a fuel cell system may comprise several fuel cell stacks that utilize a central supply system and disposal system for air, fuel, waste air and waste gas, as well as electric energy, and can serve for supplying electric energy to the pressure cabin, the systems required for supplying the pressure cabin and the compressor of the air-conditioning system as well as for supplying water for the water system of the aircraft. This water can be procured from the cathode waste air of the fuel cell system and subsequently conditioned before being distributed on board the aircraft in the form of drinking water via a distribution network. The engine and the fuel cell system can be supplied with fuel from supply reservoirs that are completely separated from one another, wherein the fuel for the fuel cell system may be hydrogen in liquid or gaseous form or of methanol depending on the fuel cells used. The fuel for the engine may be a hydrocarbon such as kerosene or also of liquid or gaseous hydrogen.

The aircraft may be free of an auxiliary power unit for generating electric energy and compressed air for the engine start, for the power supply of the aircraft on the ground and/or for the emergency power supply.

Water can be continuously produced in the aircraft over the entire duration of the flight and conditioned before it is delivered in the form of drinking water to consumers (for example, galleys, lavatories and toilets, showers and/or an air humidifying system.

Used (waste-) water can be carried off by a vacuum system, stored in collection tanks and disposed of on the ground.

In the arrangement according to the invention, excess quantities of water can already be discharged outboard by a changeover valve before the cathode waste gas of the fuel cell system is condensed.

In addition, an oxygen generator that is operated with compressed air and separates gases in accordance with the molecular sieve principle may be provided in order to ensure the oxygen supply for the passengers or the crew in the event of a cabin depressurization and to increase the oxygen partial pressure in the cathode air supply of the fuel cell system when the aircraft operates in the normal mode. Consequently, an improved efficiency of the fuel cell may be achieved.

Alternatively, the arrangement according to the invention may also comprise an oxygen generator that is operated with compressed air and separates gases in accordance with the molecular sieve principle, wherein this oxygen generator ensures the oxygen supply for the passengers or the crew in the event of a pressure cabin depressurization and increases the oxygen partial pressure in the cabin air delivered by the air-conditioning system when the aircraft operates in the normal mode. This makes it possible to lower the cabin air pressure and, in turn, to realize energy savings because it is possible to utilize smaller compressors.

In the supply system according to the invention, cathode waste air with the operating temperature of the fuel cell may accumulate. The temperature can be lowered by a heat exchanger and a steam trap. This makes it possible to obtain a sufficient quantity of condensate, to lower the cathode waste air to a temperature level between 1° Celsius and 10° Celsius and to effectively cool the fuel cell stack. Due to these measures, the heat accumulating in the condenser and during the cooling of the fuel cell stack can be returned to the cathode waste air by a heat pump system in order to subsequently deliver the obtained hot air to the wing edges via a pipeline system and thusly ensure a de-icing function. The compressor of the air-conditioning system also produces waste heat and is able to deliver this waste heat to the cathode air by the heat pump system.

Depending on the type of fuel cell used, the fuel supplied to the fuel cell system may be hydrogen for low-temperature or high-temperature polymer electrolyte membrane fuel cells. Methanol can be used in direct methanol fuel cells. The fuel may originate from a hydrogen gas tank, a container for liquid hydrogen or a methanol tank, wherein such a container can be positioned, for example, in the tail region of the aircraft behind the empennage. Such a container can be rigidly mounted at this location or be realized in the form of a removable cartridge.

The fuel supplied to the fuel cell may alternatively originate from a separate gas processor, wherein this gas processor preferably is able to produce a fuel gas that is suitable for use in the fuel cell, e.g., hydrogen, from a hydrocarbon such as kerosene.

The waste heat of the fuel cell system can be used for the vaporization and/or for the pre-heating of the fuel required for the operation of the fuel cell system, particularly hydrogen that originates from a liquid hydrogen reservoir.

When using an oxygen generator according to the molecular sieve principle, oxygen-depleted air accumulates on the non-oxygen side of the molecular sieve. This air essentially consists of nitrogen and therefore can be regarded as an inert gas mixture. This gas mixture can be used for purging the enclosure of the fuel cell system in order to prevent the formation of explosive mixtures at this location and to thusly improve the operating safety. Such oxygen-depleted gas can also be used for supplying inert gas to the fuel tanks in order to lower the risk of explosions at this location.

The distribution of electric energy in the supply system can be ensured with a central control unit.

Preferred embodiments of the invention are disclosed in the dependent claims.

Embodiments of the supply system according to the invention for the energy supply in aircraft are described below. These embodiments also apply to the aircraft and to the method for supplying an aircraft with energy.

According to another exemplary embodiment the supply system comprises a wing de-icing device that is coupled with the fuel cell in such a way that the wing de-icing device is able to de-ice the wings based on fuel products that accumulate during the operation of the fuel cell. Consequently, the waste heat of the fuel cell that may be present, for example, in hot water vapor in the form of a fuel product of a hydrogen-oxygen fuel cell can be advantageously utilized for the wing de-icing of the aircraft equipped with the supply system or as a protection against wing icing. This energy can be alternatively or additionally utilized at other locations of the supply system, for example, for vaporizing liquid hydrogen that serves as the fuel for the engine and/or the fuel cell. The wing de-icing device may be supplied with energy from the water vapor waste gas path of the fuel cell and may be operated in a particularly advantageous fashion in combination with a water supply system of an aircraft that is able to utilize the cooled and condensed water vapor for the water supply in the aircraft. Due to these measures, the actual waste product of the fuel cell, namely the water vapor, may be advantageously utilized in the aircraft in several ways, namely for warming or heating other components and simultaneously as a water source. The water supply can be realized with a low expenditure and without heavy auxiliary tanks.

According to still another exemplary embodiment the supply system is designed in such a way that the water vapor accumulating as a fuel product during the operation of the fuel cell is subjected to a condensation before the wing de-icing in order to procure water, that the remaining fuel product can be heated by a heat pump and that the heated fuel product is deliverable to the wing de-icing device. The water vapor therefore is preferably subjected to the condensation before the actual wing de-icing in order to procure water. This condensation preferably takes place before the oxygen-depleted air is reheated by a heat pump and delivered to the wing de-icing.

According to yet another exemplary embodiment the supply system is designed in such a way that the remaining fuel product is mixable with anode waste gas of the fuel cell in a reheater together with supplied hydrogen. Thus, it is also possible to realize a mixing with anode gas—so-called purge gas—and to further heat the mixture together with additionally supplied hydrogen in a reheater in order to reach the energy level required for the wing de-icing.

When cathode waste air of the fuel cell with the operating temperature of the fuel cell is accumulated, the temperature can be lowered by a heat exchanger and a steam trap in order to obtain as much condensate as possible. The cathode waste air can be lowered to a temperature level between 1° C. and 10° C. It is also possible to cool the fuel cell stack, wherein the heat accumulating in the condenser and during the cooling of the fuel cell stack can be returned to the cathode waste air by a heat pump system and the thusly obtained hot air can be delivered to the wing edges via a pipeline system in order to ensure a de-icing function. The compressor of the air-conditioning system also produces waste heat that can also be delivered to the cathode waste air by the heat pump system.

According to yet still another exemplary embodiment the supply system further comprises a generator device that is coupled with the engine. This generator device is designed in such a way that it generates energy for starting the engine and for supplying the aircraft with electric energy. Such a generator device that is embedded in a supply system according to the invention may additionally improve and refine the energy supply of components of the aircraft.

According to a further exemplary embodiment the supply system further comprises a central control unit that is designed for central controlling of the energy supply in the aircraft. This control unit can be implemented in the form of a control center of the supply system according to the invention that adapts the energy generated by the engine and the energy generated by the fuel cell to one another and apportions the generated amounts of energy to the corresponding energy consumers as required. This control unit may also control, in particular, the supply of the aircraft with water procured from the waste gas of the fuel cells, as well as a gas exchange between different gas consumers (a pressure cabin, the fuel cell, etc.). The central control unit may be realized in the form of a computer program, i.e., as software, or in the form of one or more special electric circuits i.e., as hardware, or in any hybrid form, i.e., with software components and hard work components.

According to yet a further exemplary embodiment the supply system further comprises an air supply device for supplying the cabin with breathing air, wherein the air supply device can be supplied with electric energy by the fuel cell and/or the generator device. The cabin of an aircraft is usually supplied with breathing air in order to provide breathing air for the passengers and crew members located in the cabin. This air can be obtained from the external surroundings of the aircraft. The air supply device may be supplied with electric energy by the generator device and/or by the fuel cell in order to condition the air, for example, in an air-conditioning system.

According to yet still a further exemplary embodiment the supply system comprises a compressor for supplying the air supply device with compressed gas. In other words, an air-conditioning system may be equipped with a separate compressor.

According to another exemplary embodiment the supply system comprises a DC-motor that is designed for driving the compressor. The compressor consequently may be driven by a DC-motor or by an AC-motor or by a three phase motor in order to supply the pressure cabin with fresh air and to realize the required ambient pressure for the passengers or the crew.

According to yet another exemplary embodiment in the supply system, the oxygen generator is designed in such a way that it is usable for increasing the oxygen partial pressure in the breathing air delivered by the air supply device when the aircraft operates in the normal mode. Said oxygen generator consequently may increase the oxygen partial pressure in the cabin air delivered by the air-conditioning system when the aircraft operates in the normal mode in order to lower the cabin pressure and realize a reduction of the energy and space requirement, as well as the weight, due to the ability to utilize smaller compressors.

According to yet another exemplary embodiment the supply system according to the invention further comprises a water supply device for preferably producing water continuously, wherein the water supply device is designed for procuring water from fuel products accumulating during the operation of the fuel cell. A reaction product in the form of water vapor accumulates, in particular, when using a hydrogen-oxygen fuel cell (or a hydrogen-atmospheric oxygen fuel cell), wherein this water vapor can be subjected to a condensation and, after being optimally conditioned, used as drinking water/service water in all areas of the aircraft (for example, in the galley, the toilets, etc.). This makes it possible to achieve a weight reduction in the aircraft because it is not necessary to carry along separate water tanks.

According to yet still another exemplary embodiment the supply system comprises a water conditioning device for conditioning the procured water such that drinking water is obtained. Water can be continuously produced in the aircraft over the entire duration of the flight and, after being conditioned accordingly, delivered in the form of drinking water to the consumers, for example, galleys, lavatories and WCs, showers or an air humidifying system.

According to a further exemplary embodiment the supply system comprises a waste water disposal device that serves for carrying off used water by a vacuum system, for storing in collection tanks as well as for disposing on the ground. Used water may be carried off by using a vacuum system, may be stored in collection tanks and may be disposed of on the ground in this fashion.

According to still a further exemplary embodiment the disposal system comprises a discharging device for discharging excess quantities of water that is contained in fuel products accumulating during the operation of the fuel cell before the condensation takes place. Excess quantities of water may be discharged outboard, in particular, before the condensation of the cathode waste gas of the fuel cell system by a changeover valve.

The fuel cell of the supply system according to the invention may be coupled with the cabin in such a way that starting materials on the cathode side of the fuel cell that are required for the operation of the fuel cell can be supplied from the cabin. The operation of a fuel cell may require, in particular, that oxygen be made available as a starting material. This oxygen is obtained from the air extracted from a cabin, in which the passengers are located, and delivered to the fuel cell.

The fuel cell may be coupled with the exterior surroundings of the aircraft in such a way that starting materials on the cathode side of the fuel cell that are required for the operation of the fuel cell can be supplied from the exterior surroundings of the aircraft. According to this embodiment, oxygen for the operation of the fuel cell can be obtained from the surroundings of the aircraft, i.e., from the atmosphere, subsequently compressed, if so required, and then delivered to the fuel cell for the conversion of hydrogen ions contained in hydrogen or another fuel into cathode waste gas, $H_2O$ and excess air.

The air supply device can be coupled with the exterior surroundings of the aircraft in such a way that air can be obtained from the exterior surroundings of the aircraft in order to supply the cabin with breathing air. According to this embodiment, air obtained from the atmosphere is used for supplying the passengers and the crew with breathing air, if so required, after an additional oxygenation and a compression.

This can be achieved, in particular, with an oxygen generator that serves for coupling the air supply device with the exterior surroundings of the aircraft in order to supply the cabin with oxygenated breathing air. The thusly obtained air enables the oxygen generator to achieve a sufficient oxygen concentration for supplying the required quantity of oxygen to human passengers in the cabin.

The oxygen generator may be designed such that it operates with compressed air and in accordance with the principle of molecular sieve gas separation. Consequently, an additional oxygen generator that operates with compressed air in accordance with the principle of molecular sieve gas separation can be incorporated, wherein this oxygen generator ensures the oxygen supply for the passengers or the crew in the event of a cabin depressurization on the one hand and on the other hand increases the oxygen partial pressure in the cathode air supply of the fuel cell system when the aircraft operates in the normal mode in order to improve the efficiency of the fuel cell.

According to yet still a further exemplary embodiment the supply system is designed in such a way that oxygen-depleted air accumulating during the operation of the oxygen generator can be used for purging an enclosure of the fuel cell. Due to the operating principle of the oxygen generator, oxygen-depleted air is accumulated on the non-oxygen side of the molecular sieve, wherein this air essentially consists of nitrogen and therefore can be regarded as an inert gas mixture. This inert gas mixture can be used for purging the enclosure of the fuel cell system in order to prevent the formation of explosive mixtures at this location.

According to another exemplary embodiment the supply system is designed in such a way that oxygen-depleted air accumulating during the operation of the oxygen generator can be used for impinging on a gaseous phase of a hydrocarbon contained in the first fuel reservoir and/or the second fuel reservoir. This oxygen-depleted inert gas consequently can also be used for acting upon the gas phase in tanks containing a flammable liquid hydrocarbon in order to displace the oxygen present at this location and thusly diminish the flammability.

According to still another exemplary embodiment in the supply system, the fuel cell is a modularly designed system that is composed of or comprises several fuel cell stacks that utilize a central supply device and disposal device. A modularly designed fuel cell system may comprise several fuel cell stacks that can utilize a central supply and disposal device for air, fuel, waste air and waste gas, as well as electric energy.

According to yet another exemplary embodiment in the supply system, the first fuel reservoir may be designed for supplying the engine with engine fuel in the form of a hydrocarbon or with liquid or gaseous hydrogen. In addition, the second fuel reservoir may be designed for supplying the fuel cell with a fuel cell fuel in the form of liquid or gaseous hydrogen or methanol. Depending on the type of fuel cell used, the fuel for the fuel cell system therefore may be hydrogen in liquid or gaseous form or of methanol, and the fuel for the engine may either be a hydrocarbon such as kerosene or also be liquid or gaseous hydrogen. Hydrogen for the fuel cell can also be obtained from a hydrocarbon by a gas processor. It is preferred to operate the engines with kerosene and the fuel cell with hydrogen.

According to yet still another exemplary embodiment the fuel cell is a polymer electrolyte membrane fuel cell or a direct methanol fuel cell. Depending on the type of fuel cell used, the fuel supplied to the fuel cell system therefore may be hydrogen for low-temperature or high-temperature polymer electrolyte membrane fuel cells or of methanol for direct methanol fuel cells and can be supplied from a hydrogen pressurized gas tank, a container for liquid hydrogen or a methanol tank.

The second fuel reservoir and the fuel cell may be coupled in such a way that waste heat of the fuel cell can be used for vaporizing and/or pre-heating the fuel cell fuel supplied from the second fuel reservoir. The waste heat of the fuel cell system therefore can be used for vaporizing and pre-heating the hydrogen that is required for the operation of the fuel cell system and supplied from a liquid hydrogen reservoir.

According to a further exemplary embodiment the supply system is free of an auxiliary power unit for generating electric energy and compressed air for starting the engine, for the power supply of the aircraft on the ground and/or for the emergency power supply. The supply system may completely replace a conventional auxiliary power unit for generating electric energy and compressed air for starting the engine, for the power supply of the aircraft on the ground and for the emergency power supply.

The oxygen generator may essentially also be provided for the emergency mode, wherein the oxygen to be supplied to the passengers via breathing masks in the event of a cabin depressurization can be generated with this gas generator.

Embodiments of the aircraft according to the invention are described below. These embodiments also apply to the supply system for the energy supply in an aircraft and to the method for supplying an aircraft with energy.

The second fuel reservoir may be realized in the form of one or more containers that is/are positioned in the tail region of the aircraft behind the empennageand may be rigidly installed or realized in the form of one or more removable cartridges. The second fuel reservoir therefore may be, in particular, a tank for liquid hydrogen or a methanol tank. In this respect, only the tanks for the operation of the fuel cell which contain hydrogen and methanol would be positioned in the tail section. The engines would preferably still be supplied from tanks positioned at other locations.

One aspect of the invention can be seen in providing an aircraft with an engine that does not deliver bleed air, but rather is equipped with starter generators for starting the engine and for the power supply. According to the invention, at least one modularly designed fuel cell system may also be provided and entirely or partially replace a conventional water tank. The engine and the fuel cell system can be supplied with fuel by completely separate supply devices. The modular design is particularly important with respect to redundancy considerations, particularly if a supply part fails. In addition, it is possible to utilize a central supply and disposal path or line for these modules. The fuel cell system according to the invention is able to continuously produce water over the entire duration of the flight. However, unneeded excess quantities of water can already be discharged outboard from the aircraft before the condensation takes place. This cathode waste air can also be used for wing de-icing, in which case the waste heat of the compressor of the air-conditioning system may also be used. The air-conditioning system according to the invention may be provided with a compressor with an electric motor. This compressor can be operated with a DC-motor.

Preferred embodiments of the invention are illustrated in the figures and described in greater detail below.

Figure 2:
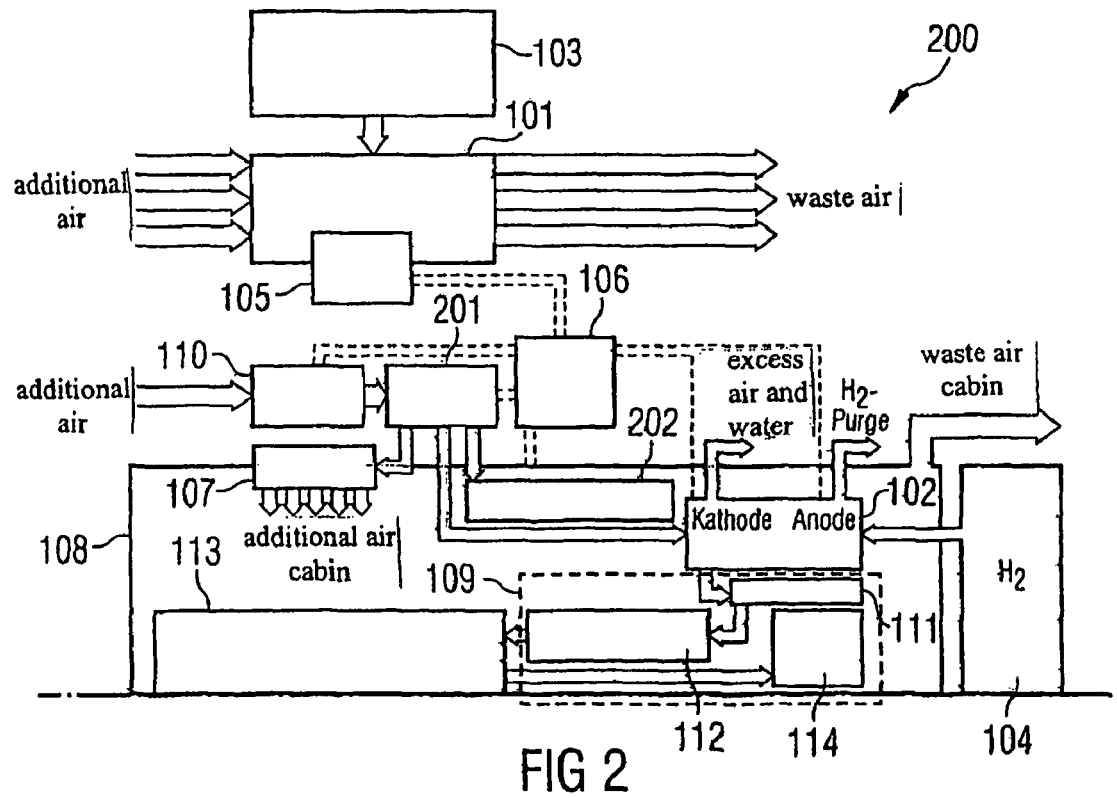
Figure 3:
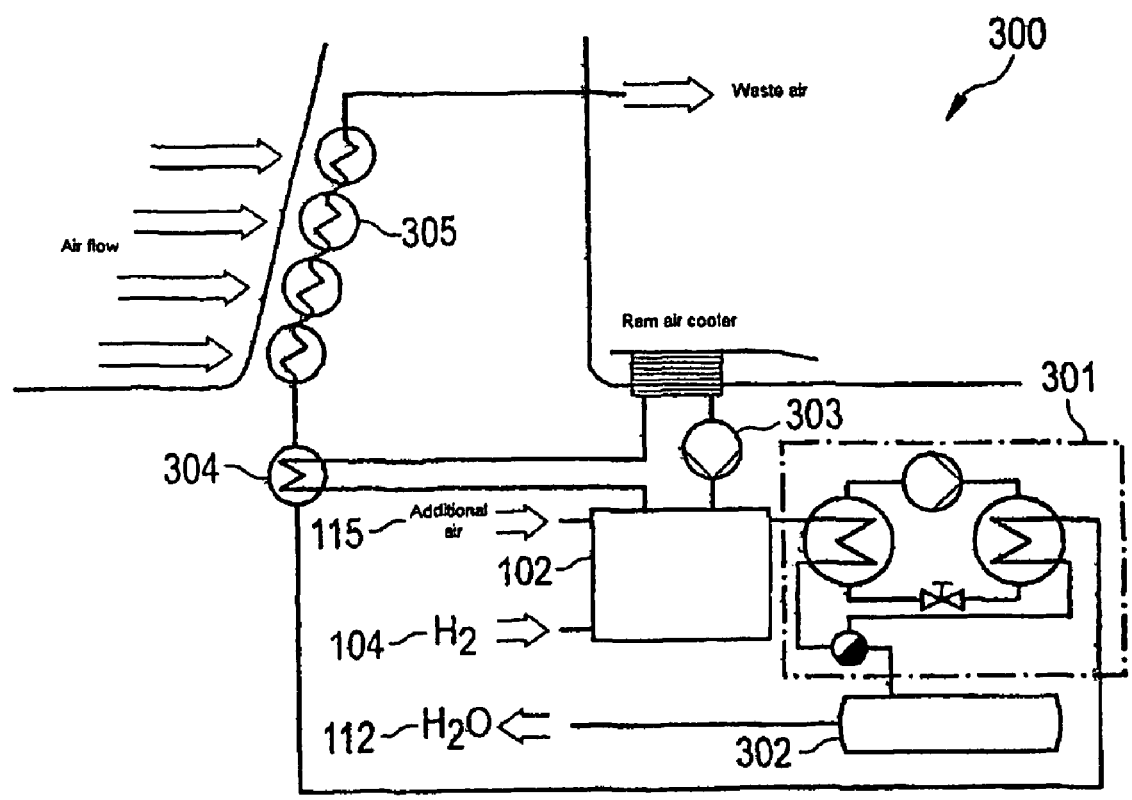

The figures show:

FIG. 1, a supply system for the energy supply in an aircraft according to a first embodiment of the invention;

FIG. 2, a supply system for the energy supply in an aircraft according to a second embodiment of the invention, and FIG. 3, a supply system for the energy supply in an aircraft according to a third of embodiment of the invention.

The embodiments are illustrated schematically in the figures and not-to-scale.

Identical or similar components are identified by the same reference signs in the different figures.

A supply system 100 for the energy supply in an aircraft according to a first embodiment of the invention is described below with reference to FIG. 1.

The supply system 100 for the energy supply in a (not-shown) aircraft comprises an engine 101 for propelling the aircraft. The supply system 100 also comprises a fuel cell 102 for supplying the aircraft with electric energy. A kerosene reservoir 103 is provided for supplying the engine 101 with engine fuel. In addition, a hydrogen reservoir 104 is provided and spatially as well as functionally separated from the kerosene reservoir 103.

The supply system 100 also comprises a starter generator 105 that is coupled with the engine 101 and designed for generating the energy for starting the engine 101 and for supplying the aircraft with electric energy. The starter generator 105 is coupled, in particular, with a control unit (regulating unit) 106 that is realized in the form of a central control unit for the central control of the energy supply in the aircraft.

An air supply device 107 supplies the pressure cabin 108 (in which passengers may be located) with additional air, wherein the air supply device 107 (an air-conditioning system) can be selectively supplied with electric energy by the fuel cell 102 and/or by the starter generator 105. The supply of electric energy to the air-conditioning system 107 and/or to a compressor 110 (that receives additional air and compresses this additional air for the air-conditioning system 107) is controlled by the electronic control unit 106.

In addition, a water supply device 109 is provided for supplying water, wherein the water supply device 109 is designed for procuring water from water vapor that accumulates during the operation of the fuel cell 102. In the water supply device 109, a condenser 111 is coupled with an outlet of the fuel cell 102, wherein the fuel cell 102 delivers water vapor to the condenser. The condenser 111 condenses the water vapor such that water is obtained and delivers this liquid water to a drinking water conditioning device 112. One outlet of the drinking water conditioning device 112 delivers water to water consumers 113 (for example, a lavatory, a galley, etc.). Water used by the water consumers 113 is discharged into a waste water tank 114.

In order to operate the fuel cell 102, oxygen is required as an oxidant—in addition to the hydrogen fuel that is supplied to the fuel cell 102 from the hydrogen reservoir 104. Additional air containing oxygen is supplied to the fuel cell 102 from the pressure cabin 108 by a ventilator 115. The fuel cell 102 is coupled with the pressure cabin 108 in such a way that a fuel starting material (namely oxygen) required for the operation of the fuel cell 102 can be supplied to the fuel cell 102 from the pressure cabin 108.

Excess quantities of air and/or water can be discharged from the fuel cell 102 (see FIG. 1). Additional air is also supplied to the engine 101 and waste gases are discharged from the engine 101.

A supply system 200 according to a second embodiment of the invention is described below with reference to FIG. 2.

In contrast to the supply system 100, an oxygen generator 201 is provided in the supply system 200, wherein said oxygen generator is coupled with an outlet of the compressor 110 such that compressed additional air can be supplied to the oxygen generator 201. The oxygen generator 201 generates, for example, oxygen-enriched gas from the additional air by utilizing a molecular sieve, wherein this oxygen-enriched gas can be delivered to the air-conditioning system 107 and, alternatively or additionally, to the fuel cell 102 and/or an emergency oxygen supply device 202.

A supply system 300 according to a third embodiment of the invention is described below with reference to FIG. 3.

In the supply system 300, waste products of the fuel cell 102 that contain water gas are delivered to a heat pump 301. Condensed water is intermediately stored in a water reservoir 302 and can be additionally processed—for example, as described above with reference to FIG. 1 or 2. In addition, condensed water or water vapor can be delivered to a wing de-icing device 305 that serves for the wing de-icing of an aircraft via a heat exchanger 304.

The implementation of the invention is not limited to the preferred embodiments illustrated in the figures. On the contrary, it would be conceivable to realize a number of variations that also utilize the described solution and the principle according to the invention in basically different embodiments.

It should also be noted that "comprise" does not exclude any other elements or steps and "a" or "an" does not exclude a plurality. It should also be noted that features or steps that were described with reference to one of the above-discussed embodiments can also be used in combination with different features or steps of other above-discussed embodiments. The reference signs in the claims should not be understood in a restrictive sense.

LIST OF REFERENCE SIGNS

100 Supply system
101 Engine
102 Fuel cell
103 Kerosene reservoir
104 Hydrogen reservoir
105 Starter generator
106 Control unit
107 Air supply device
108 Pressure cabin
109 Water supply device
110 Compressor
111 Condenser
112 Drinking water conditioning device
113 Water consumer
114 Waste water tank
115 Ventilator
200 Supply system
201 Oxygen generator
202 Emergency oxygen supply device
300 Supply system
301 Heat pump
302 Intermediate water reservoir
303 Pump
304 Heat exchanger
305 Wing de-icing device

The invention claimed is:

1. A supply system for energy supply in an aircraft, the supply system comprising:
an engine for propelling the aircraft;
a generator device coupled with the engine and designed for generating energy for starting the engine and for supplying the aircraft with electric energy;
a fuel cell for supplying the aircraft with electric energy;
a first fuel reservoir for supplying the engine with engine fuel;
a second fuel reservoir for supplying the fuel cell with fuel cell fuel; and
a central control unit that is designed for the central control of the energy supply in the aircraft;
wherein the first fuel reservoir is functionally decoupled and arranged separately of the second fuel reservoir; and
wherein the central control unit is designed for adapting the energy generated by the engine and the energy generated by the fuel cell to one another and apportions the generated amounts of energy to corresponding energy consumers as required.

2. The supply system of claim 1, comprising a wing de-icing device that is coupled with the fuel cell in such a way that a wing is de-iceable by the wing de-icing device based on fuel products that accumulate during the operation of the fuel cell.

3. The supply system of claim 2, wherein the supply system is designed in such a way that water vapor accumulating as a fuel product during the operation of the fuel cell is subjectable to a condensation before the wing de-icing in order to procure water, and wherein the remaining fuel product is heatable by a heat pump and the heated fuel product is deliverable to the wing de-icing device.

4. The supply system of claim 3, wherein the supply system is designed in such a way that the remaining fuel product is mixable with anode waste gas of the fuel cell and is heatable in a reheater together with supplied hydrogen.

5. The supply system of claim 1, comprising an air supply device for supplying a cabin with breathing air, wherein the air supply device can be supplied with electric energy by the fuel cell and/or by the generator device.

6. The supply system of claim 1,
comprising a compressor for supplying the air supply device with compressed gas.

7. The supply system of claim 1,
comprising a DC-motor that is designed for driving the compressor.

8. The supply system of claim 1,
comprising a water supply device for preferably generating water continuously, wherein the water supply device is designed for procuring water from fuel products accumulating during the operation of the fuel cell.

9. The supply system of claim 8,
comprising a water conditioning device for conditioning procured water such that drinking water is obtained.

10. The supply system of claim 8,
comprising a waste water disposal device for carrying off used water by a vacuum system for storing the waste water in collection tanks and for disposing of the waste water on the ground.

11. The supply system of claim 8,
comprising a discharging device for discharging excess quantities of water of fuel products accumulating during the operation of the fuel cell before the condensation takes place.

12. The supply system of claim 5,
wherein the fuel cell is coupled with the cabin in such a way that fuel starting materials of the fuel cell that are required for the operation of the fuel cell can be supplied from the cabin.

13. The supply system of claim 1,
wherein the fuel cell is coupled with the external surroundings of an aircraft in such a way that fuel starting materials of the fuel cell that are required for the operation of the fuel cell can be supplied from the external surroundings of an aircraft.

14. The supply system of claim 5,
wherein the air supply device is coupled with the external surroundings of an aircraft in such a way that air can be supplied from an external surroundings of the aircraft in order to deliver breathing air to the cabin.

15. The supply system of claim 14,
comprising an oxygen generator by which the air supply device is coupled with an external surroundings of an aircraft in order to deliver oxygen-enriched breathing air to the cabin.

16. The supply system of claim 15,
wherein the oxygen generator can be operated with compressed air and is designed for the gas separation in accordance with the molecular sieve principle.

17. The supply system of claim 15,
wherein the oxygen generator is designed for increasing the oxygen partial pressure in the breathing air delivered by the air supply device when the aircraft operates in the normal mode.

18. The supply system of claim 15,
wherein the supply system is designed in such a way that oxygen-depleted air accumulating during the operation of the oxygen generator is usable for purging an enclosure of the fuel cell.

19. The supply system of claim 15,
wherein the supply system is designed in such a way that oxygen-depleted air accumulating during the operation of the oxygen generator is usable for impinging on a gaseous phase of a hydrocarbon accommodated in the first fuel reservoir and/or in the second fuel reservoir.

20. The supply system of claim 1,
wherein the fuel cell is a modularly designed system comprising several fuel cell stacks that utilize a central supply device and disposal device.

21. The supply system of claim 1,
wherein the first fuel reservoir is designed for supplying the engine with an engine fuel in the form of liquid or gaseous hydrogen or methanol.

22. The supply system of claim 1,
wherein the second fuel reservoir is designed for supplying the fuel cell with fuel cell fuel in the form of liquid or gaseous hydrogen or methanol.

23. The supply system of claim 1,
wherein the fuel cell is a polymer electrolyte membrane fuel cell or a direct methanol fuel cell.

24. The supply system of claim 1,
wherein the second fuel reservoir and the fuel cell are coupled in such a way that waste heat of the fuel cell is usable for vaporizing and/or pre-heating fuel cell fuel originating from the second fuel reservoir.

25. The supply system of claim 1,
wherein the supply system is free of an auxiliary power unit for generating the electric energy and compressed air required for starting the engine, for the power supply of the aircraft on the ground and/or the emergency power supply.

26. A method for supplying an aircraft with energy, the method comprising:
propelling the aircraft by an engine;
supplying the aircraft with electric energy by a fuel cell and by an engine-driven generator;
supplying the engine with engine fuel from a first fuel reservoir;
supplying the fuel cell with fuel cell fuel from a second fuel reservoir;
functionally decoupling and arranging separately the first fuel reservoir and the second fuel reservoir; and
adapting the energy generated by the engine and the energy generated by the fuel cell to one another and apportioning the generated amounts of energy to corresponding energy consumers as required by means of a central control unit.

\* \* \* \* \*

UNITED STATES PATENT AND TRADEMARK OFFICE
CERTIFICATE OF CORRECTION

PATENT NO. : 7,954,753 B2
APPLICATION NO. : 11/792283
DATED : June 7, 2011
INVENTOR(S) : Claus Hoffjann et al.

It is certified that error appears in the above-identified patent and that said Letters Patent is hereby corrected as shown below:

In the Claims:

Col. 13, Line 4, "claim 1," should read --claim 6,--.

Signed and Sealed this
Second Day of July, 2013

Teresa Stanek Rea
*Acting Director of the United States Patent and Trademark Office*